United States Patent [19]

Sugano et al.

[11] 4,416,606
[45] Nov. 22, 1983

[54] APPARATUS FOR GRANULATING SODIUM PERCARBONATE

[75] Inventors: Junichiro Sugano, Nagoya; Shuichi Kobayashi, Yokkaichi; Tomoyuki Yui, Yokkaichi; Tsuneo Fujimoto, Yokkaichi; Minoru Kubota, Yokkaichi, all of Japan

[73] Assignee: Mitsubishi Gas Chemical Company, Inc., Tokyo, Japan

[21] Appl. No.: 313,199

[22] Filed: Oct. 20, 1981

[30] Foreign Application Priority Data

Oct. 22, 1980 [JP] Japan ................................ 55-147760
Jul. 30, 1981 [JP] Japan ................................ 56-119640

[51] Int. Cl.³ ............................................. B01F 7/08
[52] U.S. Cl. ..................................... 425/202; 366/321; 366/322
[58] Field of Search ...................... 366/85, 88, 90, 321, 366/322; 425/202, 204; 198/661, 676

[56] References Cited

U.S. PATENT DOCUMENTS

Re. 30,378  8/1980  Bice et al. ............................. 366/85
3,085,288   4/1963  Street ................................... 366/85
3,595,533   7/1971  Sutter .................................. 366/88
3,652,064   3/1972  Lehnen et al. ......................... 366/88
4,118,164  10/1978  Wenger et al. ....................... 425/202

Primary Examiner—Hiram H. Bernstein

Attorney, Agent, or Firm—Wenderoth, Lind & Ponack

[57] ABSTRACT

Provided is a new granulator for preparing granules from a powdery material by agglomerating it through a kneading action, comprising a receptacle and two screws having screw blades disposed within the receptacle in parallel alignment to ensure intermeshing of the screw blades. The novel granulator consists of a feeding zone, a kneading zone divided into an upstream section and a downstream section, and a breaking zone. In the feeding zone, the blades on the two screws are forwardly conveying blades. In the upstream section of the kneading zone, on one screw a backwardly conveying blade is first provided and a forwardly conveying blade follows, and on the other screw, a forwardly conveying blade comes first and a backwardly conveying blade follows, said alternate arrangement occurring at least once in each screw. In the downstream section of the kneading zone, the blades on both of the screws are backwardly conveying screws. In the breaking zone, a plurality of small projections are provided on the peripheral surfaces of the screw shafts. The material transferred to the kneading zone from the feeding zone gradually advances while repeating a forward movement and a backward movement in an 8-figured pattern whereby it is agglomerated. The agglomerates are then broken by the projection in the breaking zone into granules of a suitable size.

3 Claims, 5 Drawing Figures

APPARATUS FOR GRANULATING SODIUM PERCARBONATE

This invention relates to an apparatus for continuously granulating a powder by kneading and agglomerating it in the wet state and more specifically, to a granulator especially suitable for granulating powdery sodium percarbonate.

Sodium percarbonate can be easily obtained by reacting sodium carbonate and hydrogen peroxide, and is useful as a bleaching agent, etc. Handling of powdery sodium percarbonate is inconvenient because it irritates the mucous membrane of the nose upon scattering. Moreover, since a finely divided powder of sodium percarbonate tends to cake on long-term storage, it is extremely difficult to keep it non-sticky. Furthermore, sodium percarbonate is unstable to moisture, and moisture tends to reduce the content of active oxygen of sodium percarbonate. It is desirable therefore to reduce the area of contact of sodium percarbonate powder with moisture. For these reasons, sodium percarbonate is generally converted to granules.

Generally, sodium percarbonate has previously been pelletized by means of a pelletizer (a manufacture of Fuji-Powder) in which it is kneaded with suitable additives such as a binder and a stabilizer and water and then the kneaded mixture is extruded through a perforated plate, or by means of a granulator of the Henschel mixer type.

Granules having a relatively uniform shape can be obtained by the aforesaid method comprising extrusion of the kneaded mixture through the perforated plate. But the granules are hard, and because of a restriction on the pore size of the perforated plate, the resulting granules have a large particle diameter and a slow speed of dissolution in water. Furthermore, the pores of the porous plate tend to be blocked up, and the porous plate must be exchanged incessantly. These drawbacks make this method unsuitable for continuous operation. The granulator of the Henschel mixer type has the advantage that granulation is performed within a short period of time, and the heat of friction is little. However, the granules obtained are soft and brittle, and tend to be crushed during transportation. Furthermore, the granules have a low bulk density.

Various apparatus for continuously kneading a material have been known which comprise a receptacle and two intermeshing rotating screws provided therein. When sodium percarbonate is granulated by these known apparatus, it is impossible to obtain particles which fully meet these requirements for the particle size, hardness and speed of dissolution of these particles.

It is an object of this invention therefore to remove the various defects of the prior art, and to provide an apparatus and a method which can convert powdery sodium percarbonate continuously in one step without any need for pre-treatment into granular sodium percarbonate having a fully satisfactory particle size, hardness, bulk density and speed of dissolution in water.

The object of the invention is achieved in accordance with this invention by a granulator comprising a receptacle and a pair of intermeshing rotating screws provided therein in parallel alignment, one end of the receptacle having a hopper for charging a material, the other end thereof having a downwardly opening discharge port and the top surface thereof having a cover; wherein the inside of said receptacle is composed of a feeding zone, a kneading zone and a breaking zone, the feeding zone has forwardly conveying screw blades on both of the two screws, the kneading zone is comprised of an upstream section and a downstream section, said upstream section having an alternate arrangement of a pair of a backwardly conveying screw blade on one screw shaft and a forwardly conveying screw blade on the other in opposition to each other and a pair of a forwardly conveying screw blade on said one screw shaft and a backwardly conveying screw blade on said other screw shaft in opposition to each other, said alternation of the forwardly and backwardly conveying screw blades occurring at least once in each of said screw shafts, and either one of the forwardly and backwardly conveying screw blade in each pair being discontinuous for meshing with the other screw blade in said pair, and said downstream section having backwardly conveying screw blades on both of the two screw shafts, the blades are aligned with the same pitch in each of the feeding zone, the upstream section of the kneading zone and the downstream section thereof, the breaking zone is of an open structure and has a plurality of projections provided on both of the two screw shafts for breaking agglomerated masses, and that portion of the cover of said receptable which corresponds to the feeding zone and the upstream section of the kneading zone is a fixed cover and that portion of the cover of the receptacle which corresponds to the downstream section of the kneading zone is a movable cover.

The object of the invention is also achieved in accordance with this invention by a method for granulating sodium percarbonate, which comprises feeding powdery sodium percarbonate, an additive such as a binder or a stabilizer and water into the granulator through said hopper, kneading and agglomerating the powdery sodium percarbonate therein, and making the particle size of the resulting agglomerated masses by a size uniforming machine equipped with knife cutters rotating at high speeds.

In the granulator of this invention, each screw blade generally has a trapezoidal shape in its cross-section taken at right angles to the advancing direction of the thread of the screw. In another embodiment of the invention, the screw blades of the feeding zone and the downstream section of the kneading zone have a large thickness and a trapezoidal cross-section, both of the forwardly and backwardly conveying screw blades in the upstream section of the kneading zone are formed as thin twisted blades, and thin fragmentary ribbon-like blades are provided between the discontinuous backwardly conveying screw blades. The height of the ribbon-like blades is lower than that of the other blades because this permits effective mixing of the materials.

The present invention will now be described in more detail with reference to the accompanying drawings in which.

Figure 1:
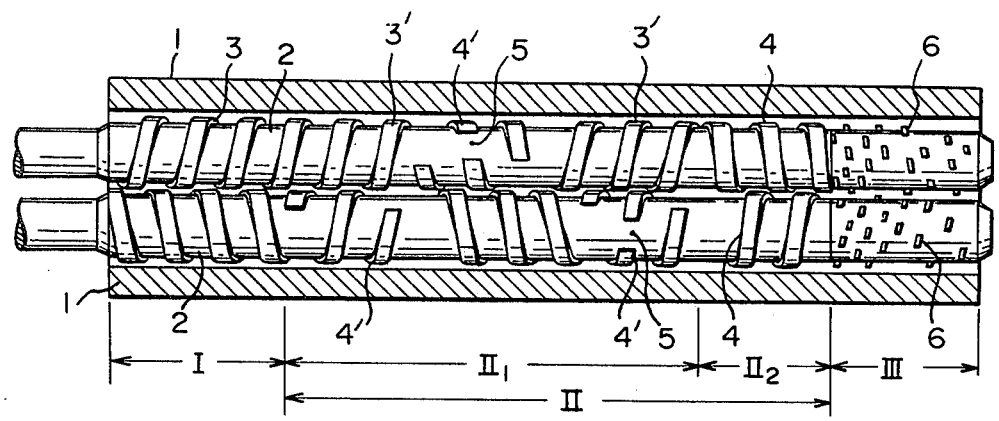
FIG. 1 is a sectional plan view of one example of the granulator in accordance with this invention.
Figure 2:
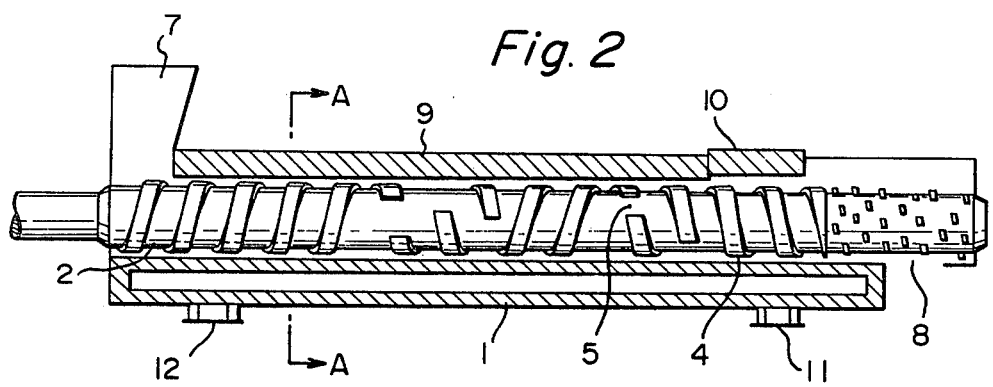
FIG. 2 is a vertical sectional side view of the granulator.
Figure 3:
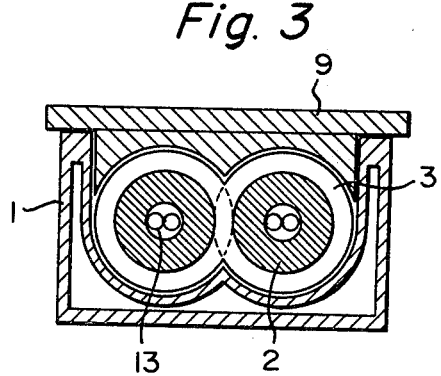
FIG. 3 is a sectional view taken along line A—A of FIG. 2.

Referring to FIGS. 1 to 3, the reference numeral 1 represents a receptacle of the granulator; 2, a screw shaft; 3, a forwardly conveying screw blade; 4, a backwardly conveying screw blade; 4', a discontinuous backwardly conveying screw blade; 3', a forwardly conveying screw blade in opposition to the blade 4'; 5, a meshing or discontinuous section; 6, a projection; 7, a hopper; 8, a discharge port; 9, a fixed cover; 10, a movable cover; and 11, 12 and 13, inlets or outlets for cooling water.

The inside of the granulator of the invention is composed of a feeding zone I, a kneading zone II and a breaking zone III as shown in the drawings. In the feeding zone I, forwardly conveying screw blades 3 are formed on both of the two screws so as to deliver the material to the kneading zone. The kneading zone II is comprised of an upstream section II$_1$ and a downstream section II$_2$. In the upstream section II$_1$, forwardly conveying screw blades 3' and backwardly conveying screw blades 4' are alternately provided on one of the screws in such a manner that a forwardly conveying blade 3' is first formed and is followed by a backwardly conveying blade 4' and this sequence is repeated. On the other screw, the same alternate alignment of screw blades occurs except that it starts with a backwardly conveying screw 4'. According to this blade arrangement, any forwardly conveying blade 3' on one screw faces a backwardly conveying blade 4' on the other, and any backwardly conveying blade 4' on one screw faces a forwardly conveying blade 3' on the other. In the illustrated embodiment, the backwardly conveying screw blades 4' are discontinuous blades. In the downstream section II$_2$, the screw blades on both of the two screws are adapted to perform backward conveyance.

By making the screw blades in the kneading zone II in a special structure and aligning them in a special arrangement as described hereinabove, the materials charged make an 8-figured motion in the kneading zone II, and consequently, are well kneaded and agglomerated.

In the breaking zone III, a plurality of projections 6 are secured to the two screw shafts so that agglomerated masses sent from the kneading zone II are broken by these projections 6.

In the granulator of the type shown in FIGS. 1 to 3, any of the screw blades provided in the feeding zone and the upstream and downstream sections of the kneading zone is trapezoidal in its crosssection taken at right angles to the advancing direction of the thread of the screws.

Figure 4:
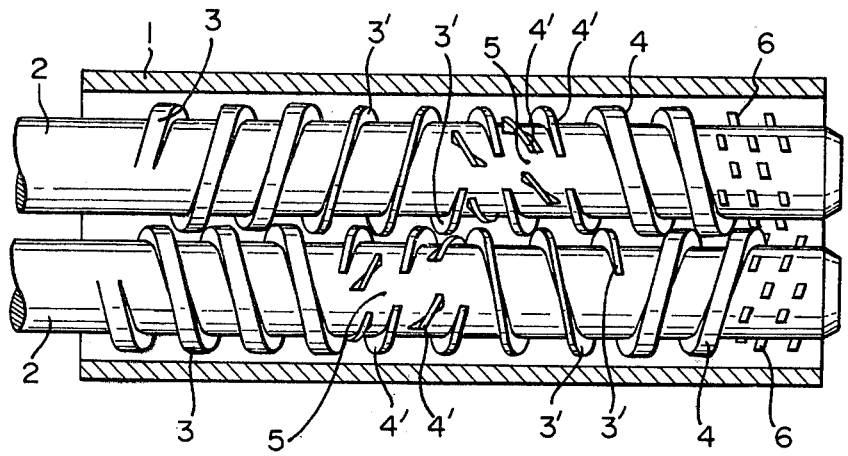
FIG. 4 is a cross-sectional plan view of a modified equipment of the granulator in which thin twisted fragmentary blades and thin twisted ribbon-like blades are used in the upstream section of the mixing and kneading zone.
Figure 5:
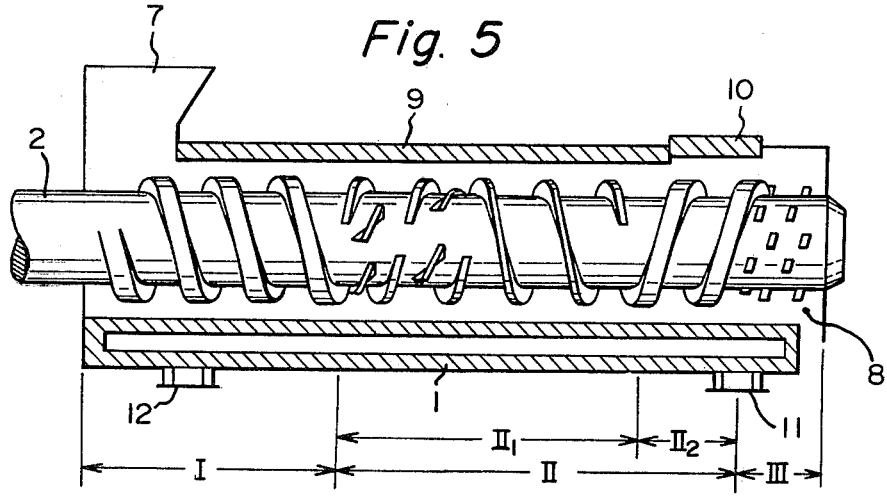
FIG. 5 is a longitudinal sectional side elevation of the modified granulator shown in FIG. 4.

In the modified embodiment shown in FIGS. 4 and 5, the screw blades in the feeding zone and the downstream section of the kneading zone has the same trapezoidal sectional shape as in FIGS. 1 to 3, but both the forwardly and backwardly conveying screw blades in the upstream section of the kneading zone are thin twisted blades. Specifically, the thin twisted fragmentary ribbon-like blades 4'' are provided between the discontinuous backwardly conveying screw blades 4'.

The screw blades are aligned with the same pitch in each of the feeding zone, the upstream section of the kneading zone, and the downstream zone thereof. Preferably, the pitch between the blades in the kneading zone is larger than that between the blades in the feeding zone.

In the granulator of the invention, the screw blades in the feeding zone are forwardly conveying blades, and the kneading zone include forwardly conveying blades, discontinuous backwardly conveying blades, and backwardly conveying blades. By arranging these blades in the manner described hereinabove, a material transferred from the feeding zone I is sufficiently mixed and kneaded into agglomerates by the forward conveying action of the forwardly conveying blades and the returning action of the backwardly conveying blades. The agglomerates are sent to the breaking zone III by a proper balance between the feeding power of the feeding zone and the backwardly conveying power of the backwardly conveying blades in the downstream section of the kneading zone II. Usually, the agglomerates sent to the breaking zone III have some thixotropy. In the breaking zone, the agglomerated masses are broken and the thixotropy of the material is removed. For sufficient performance of this operation, it is desirable to cause the agglomerates to reside for a certain period of time in the breaking zone so as to impart a kind of agitation thereto. This operation can be effectively performed according to a preferred embodiment by forming those projections which are located in the upstream portion of the breaking zone near the downstream section II$_2$ of the kneading zone in a slightly angled vane shape to permit slight backward conveyance of the agglomerated product, or by providing projections 6 densely in the upstream portion of the breaking zone and sparsely in its downstream portion. The structure of the breaking zone, however, is not limited to the embodiment specifically illustrated above, and can be determined as desired depending upon the state of the material transferred from the kneading zone. For example, when the material has undergone a relatively weak kneading force in the kneading zone, the projections may be rod-like projections adapted to mainly perform a breaking action. When the material has experienced a strong kneading force, the projections may be vane-like projections adapted to have the function of removing thixotropy.

In the granulator of this invention, a cover adapted for up-and-down movement is provided at that part of the granulator which corresponds to the downstream section II$_2$ of the kneading zone. The cover is slightly opened at the downstream side of the section II$_2$ so that it does not cover all of the backward conveying screw blades in the section II$_2$. When it is desired to obtained agglomerates having a relatively high bulk density with a strong kneading force exerted in the kneading zone, it is sufficient only to lower the movable cover slightly. On the other hand, when it is desired to obtain agglomerates having a low bulk density with a relatively weak kneading force exerted in the kneading zone, the movable cover is slightly raised. Furthermore, because of the open structure of the cover at the downstream side of the section II$_2$, agglomerated means can be disintegrated to some extent.

When it is necessary to cool the granulator of the present invention, cooling water may be passed through a jacket provided externally of the receptacle of the granulator and a preset pipe within the screw shafts. The conditions for agglomerating powdery sodium percarbonate by the granulator of this invention cannot be generalized because they may differ depending upon the size and capacity of the granulator, the particle size and water content of the starting powdery sodium percarbonate, the type of the additive, etc. For example, the conditions are: the diameter of each screw blade 270 mm; the total length of the receptacle 2400 mm; the rotating speed of the screws 40 to 80 rpm; the amount of the material to be fed 700 to 2000 kg/hr. The amounts of the additive and water are determined depending upon the type of the additive and the water content of the starting sodium percarbonate so that the water content of the resulting granules will be about 10 to 16%.

The agglomerates produced by the granulator of this invention are discharged from the discharge port 8, subjected to size adjustment by a size uniforming machine equipped with a knife cutter adapted for high-speed rotation, and dried to form a final product. The size uniforming machine is comprised of a rotating shaft equipped with 8 to 12 double vane-like knife cutters, a cover having a hopper for charging the granules, and a cylindrical vertical bottomless receptacle having a height of 25 to 150 mm. The rotating shaft is enclosed within the cylindrical vertical bottomless receptacle with a slight clearance being provided between the tips of the knife cutters and the inner wall of the receptacle, and the knife cutters are rotated at a high speed of 1000 to 4000 rpm. If the number of knife cutters is the same, the average particle diameter of the granules becomes smaller as the rotating speed of the cutters is higher and the length of the cylindrical receptacle is larger. For example, if the height of the cylindrical receptacle is 25 mm, the number of the knife cutters is eight, and the rotating speed of the knife cutters is 4000 rpm and the same number of knife cutters and the same rotating speed are used, the resulting particles have an average particle diameter of 610 microns. If the height of the cylindrical receptacle is 150 mm, the resulting particles have an average particle diameter of 430 microns. Furthermore, if the height of the cylindrical receptacle and the rotating speed remain the same, the average particle diameter of the particles tend to become smaller as the number of the knife cutters is increased. For example, if the rotating speed is 4000 rpm and the height of the cylindrical receptacle is 150 mm, the use of 12 knife cutters gives particles having an average particle diameter of 340 microns.

The bulk density, hardness and speed of dissolution of the particles granulated by the process of this invention are mainly affected by the state of kneading in the granulator, and the particle size of the particles is determined by the conditions for operating the size adjusting machine.

EXAMPLE

A granulator of the same structure as shown in FIGS. 1 to 3 was used. Sodium percarbonate having a particle diameter of 50 to 100 microns and a water content of 8 to 10% was charged continuously at a rate of 20 kg/hr from the hopper 7, and a 15% aqueous solution of sodium meta-silicate as a binder was fed at a rate of 2 liters/hr. The rotating speed of the screws was adjusted to 80 rpm, and the height of the movable cover, to 6 mm. The sodium percarbonate was kneaded in the granulator, and passed through cooling water in a jacket of the granulator receptacle and a pipe within the screws shafts to obtain agglomerates. The resulting agglomerates were then subjected to size adjustment by a cylindrical size-adjusting machine having a length of 150 mm and equipped with eight knife cutters rotating at 4000 rpm. The granules were then dried to obtain a final product. The properties of the product are shown in Table 1.

TABLE 1

| Particle diameter distribution | | | | Speed of dissolution in water (*) | | | | Strength of particles (*2) | | |
|---|---|---|---|---|---|---|---|---|---|---|
| 20 mesh on (%) | 20–80 mesh (%) | 80 mesh under (%) | Particle diameter (μ) | 1 min. (%) | 2 min. (%) | 5 min. (%) | Bulk density | 32 mesh on (%) | 32–60 mesh (%) | 60 mesh under (%) |
| 10 | 80 | 10 | 450 | 50 | 80 | 100 | 0.75 | −10 | +8 | +2 |

(*1) The speed of dissolution in water of the particles was determined as follows: One liter of pure water was put in a 1-liter beaker, and 5g of the sample was added. A stirring blade having a height of 40mm and a width of 25mm was rotated at a speed of 250 rpm to agitate the water for a predetermined period of time while maintaining the water temperature at 25° C. ± 1° C. The solution was sampled every predetermined time, and the concentration of hydrogen peroxide was measured by titration with 1/10N KMnO₄. The speed of dissolution in water of the particles was determined from the results obtained.
(*2) The strength of particles was determined as follows: A 32-mesh screen and a 60-mesh screen were each set on a shaking screen. One hundred grams of the sample was put into each of the screen, and shaken for 1 hour at 450 rpm. The strength of the particles was expressed by a increase or decrease of the sample on each screen which resulted from shaking.

COMPARATIVE EXAMPLE

A vertical Henschel mixer-type granulator was used. Twenty kilograms of the same sodium percarbonate powder as used in the Example was introduced into the granulator, and 2 liters of a 15% aqueous solution of sodium meta-silicate as a binder was added. They were kneaded for 3 minutes to obtain agglomerates. The agglomerates were subjected to size adjustment by the same size uniforming machine as used in the Example and dried to obtain a final product. The properties of the product are shown in Table 2. It is seen that although the speed of dissolution is very fast, the particles obtained have a low bulk density and a weak strength. The product was therefore not entirely satisfactory.

TABLE 2

| Particle size distribution | | | | Speed of dissolution in water | | | | Strength of particles | | |
|---|---|---|---|---|---|---|---|---|---|---|
| 20 mesh on (%) | 20–80 mesh (%) | 80 mesh under (%) | Particle diameter (μ) | 1 min. (%) | 2 min. (%) | 5 min. (%) | Bulk density | 32 mesh on (%) | 32–60 mesh (%) | 60 mesh under (%) |
| 5 | 75 | 20 | 380 | 70 | 90 | — | 0.65 | −20 | +10 | +10 |

What is claimed is:

1. A granulator comprising a receptacle and a pair of intermeshing rotating screws provided therein in parallel alignment, one end of the receptacle having a hopper for charging a material, the other end thereof having a downwardly opening discharge port and the top surface thereof having a cover; wherein
- the inside of said receptacle is composed of a feeding zone, a kneading zone and a breaking zone,
- the feeding zone has forwardly conveying screw blades on both of the two screws,
- the kneading zone is comprised of an upstream section and a downstream section, said upstream section having an alternate arrangement of a pair of a backwardly conveying screw blade on one screw shaft and a forwardly conveying screw blade on the other in opposition to each other and a pair of a forwardly conveying screw blade on said one screw shaft and a backwardly conveying screw blade on said other screw shaft in opposition to each other, said alternation of the forwardly and backwardly conveying screw blades occurring at least once in each of said screw shafts, and either one of the forwardly and backwardly conveying screw blades in each pair being discontinuous for meshing with the other screw blade in said pair, and said downstream section having backwardly conveying screw blades on both of the two screw shafts,
- the blades are aligned with the same pitch in each of the feeding zone, the upstream section of the kneading zone and the downstream section thereof,
- the breaking zone is of an open structure and has a plurality of projections provided on both of the two screw shafts for breaking agglomerated masses, and
- that portion of the cover of said receptacle which corresponds to the feeding zone and the upstream section of the kneading zone is a fixed cover and that portion of the cover of the receptacle which corresponds to the downstream section of the kneading zone is a movable cover.

2. The granulator of claim 1 wherein the backwardly conveying screw blades in the kneading zone are discontinuous blades.

3. The granulator of claim 1 wherein both of the forwardly conveying and backwardly conveying screw blades in the upstream section of the kneading zone are formed as thin twisted blades, and thin twisted fragmentary ribbon-like blades are interposed between the discontinuous backwardly conveying screw blades.

* * * * *